United States Patent
Dawson

(10) Patent No.: US 9,528,881 B1
(45) Date of Patent: Dec. 27, 2016

(54) STRESS ISOLATED DETECTOR ELEMENT AND MICROBOLOMETER DETECTOR INCORPORATING SAME

(71) Applicant: FREESCALE SEMICONDUCTOR, INC., Austin, TX (US)

(72) Inventor: Chad Dawson, Queen Creek, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/999,523

(22) Filed: May 18, 2016

(51) Int. Cl.
*G01J 5/20* (2006.01)
*G01J 5/02* (2006.01)

(52) U.S. Cl.
CPC .. *G01J 5/20* (2013.01); *G01J 5/02* (2013.01); *G01J 2005/202* (2013.01)

(58) Field of Classification Search
CPC ................ G01J 5/20; G01J 5/02; G01J 5/023
USPC ................... 250/338.1, 338.3, 338.4
See application file for complete search history.

(56) References Cited

U.S. PATENT DOCUMENTS

| | | | |
|---|---|---|---|
| 6,144,030 A | 11/2000 | Ray et al. | |
| 6,667,479 B2 | 12/2003 | Ray | |
| 8,546,757 B2 | 10/2013 | Hanson | |
| 8,809,786 B2 * | 8/2014 | Oulachgar | G01J 5/023 250/338.3 |
| 9,199,838 B2 | 12/2015 | O'Brien et al. | |
| 2016/0178444 A1 * | 6/2016 | Oulachgar | G01J 5/20 250/349 |

FOREIGN PATENT DOCUMENTS

WO   WO-2013/010933 A1   1/2013

* cited by examiner

*Primary Examiner* — David Porta
*Assistant Examiner* — Meenakshi Sahu
(74) *Attorney, Agent, or Firm* — Charlene R. Jacobsen

(57) ABSTRACT

A detector element for a microbolometer detector includes a platform structure spaced apart from a substrate. The platform structure has a peripheral region surrounding a central region. First and second contacts are located at the peripheral region proximate opposing first and third edges of the peripheral region. A stiff beam structure extends across the central region between the first and second contacts, and at least one sensor is located at the peripheral region proximate at least one of second and fourth edges of the peripheral region. An optically absorptive material structure of a grid pattern of first and second material portions may be located at the central region. First material portions perpendicular to the beam structure may connect to the beam structure and to inner edges of the peripheral region, and none of the second material portions extend continuously between and couples to opposing inner edges of the peripheral region.

20 Claims, 11 Drawing Sheets

PRIOR ART

STRESS ISOLATED DETECTOR ELEMENT AND MICROBOLOMETER DETECTOR INCORPORATING SAME

TECHNICAL FIELD OF THE INVENTION

The present invention relates generally to the field of microbolometer detectors. More specifically, the present invention relates to a stress isolated detector element for a microbolometer detector.

BACKGROUND OF THE INVENTION

Thermal detectors, also referred to as infrared (IR) detectors, are sensors that operate by absorbing energy from electromagnetic radiation and by converting the heat generated by the absorption of this energy into an electrical signal representative of the amount of absorbed radiation. Thermal detectors may be utilized to detect fires, overheating machinery, planes, vehicles, people, animals, and any other objects that emit thermal radiation. Thermal detectors may also be used in non-imaging applications such as radiometers, gas detectors, and other thermal or infrared detectors.

One type of thermal detector is known as a microbolometer detector. A microbolometer detector is generally based on a suspended platform structure, sometimes referred to as a bridge. The platform structure is generally held above and thermally insulated from a substrate by a support structure. The suspended platform structure may be provided with a thermistor whose electrical resistivity varies in response to temperature variations caused by the absorbed radiation.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a detector element, a microbolometer detector that includes the detector element suspended above a substrate by a support structure, and a microbolometer focal plane array that includes a plurality of the microbolometer detectors. More particularly, the present disclosure concerns a design for the detector element which substantially isolates the support structure from stress in the detector element. This stress isolation results in less stress being transmitted to the support structure. A reduction in stress to the support structure can limit twisting and/or tilting of the detector element to commensurately reduce the potential for malfunction due to thermal shorting between adjacent microbolometer detectors.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like may be used herein solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
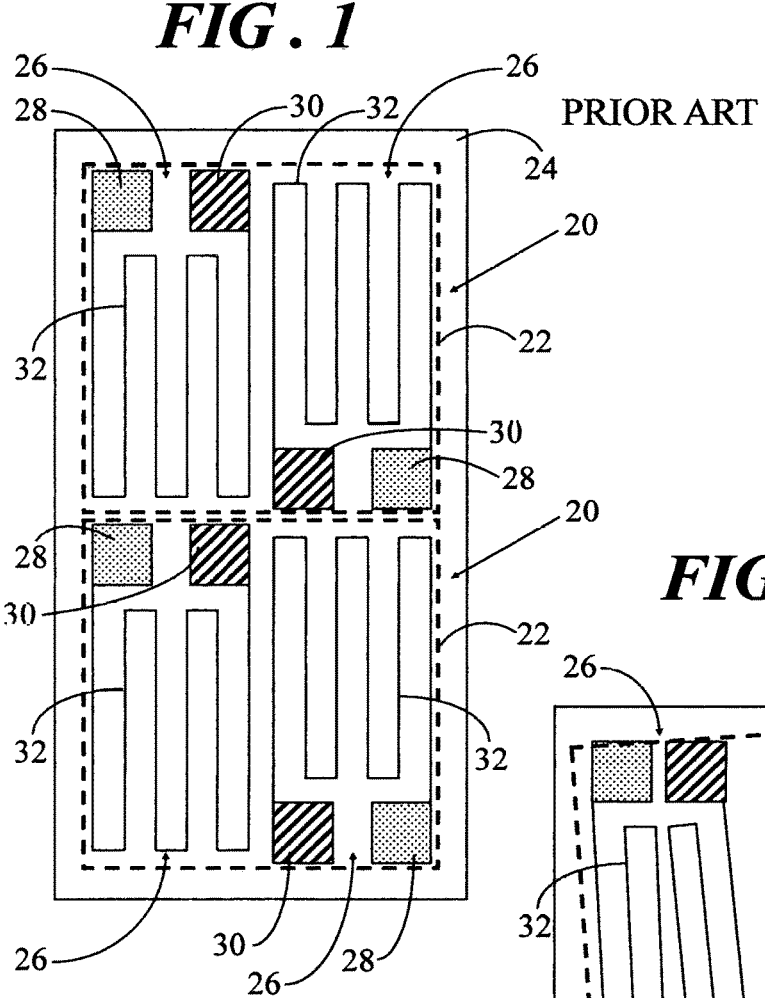
FIG. 1 shows a simplified top view of a pair of adjacent prior art microbolometer detectors that may be incorporated into a two-dimensional array of microbolometer detectors.

Referring to FIG. 1, FIG. 1 shows a simplified top view of a pair of adjacent prior art microbolometer detectors 20 that may be incorporated into a two-dimensional array of microbolometer detectors 20. A two-dimensional array of microbolometer detectors 20 may include a plurality of microbolometer detectors 20 arranged in columns and rows, arranged in a linear array, or may be provided at arbitrary locations that do not conform to a specific pattern. Each microbolometer detector 20 may correspond to a respective pixel in each image detected by a thermal detector (not shown).

In this simplified illustration, each of microbolometer detectors 20 includes a detector element 22 (represented by a dashed line box) suspended in spaced apart relationship from a substrate 24 by a pair of support structures 26. In this example, each of support structures 26 includes a first post 28 (represented by a stippled pattern) projecting substantially vertically toward and connected to substrate 24, a second post 30 (represented by upwardly and rightwardly directed wide hatching) projecting substantially vertically toward and connected to detector element 22, and a support arm 32 spaced apart from substrate 24. Support arm 32 has a serpentine configuration meandering between first post 28 and second post 30. Thus, support structures 26 are interposed between substrate 24 and detector elements 22. For clarity, detector elements 22 are represented by dashed line boxes in order to reveal the underlying support structures 26, which would normally be hidden in this top view.

Throughout the description, the terms "vertical" and "vertically" refer to a direction perpendicular to a plane parallel to the conventional plane or surface of the substrate. It should be further understood that the term "post" also used throughout the description refers generally to a structural element of the support structure that extends mainly vertically at a height from the substrate. Thus, the height of each post defines the spacing between the detector element and the substrate.

Figure 2:
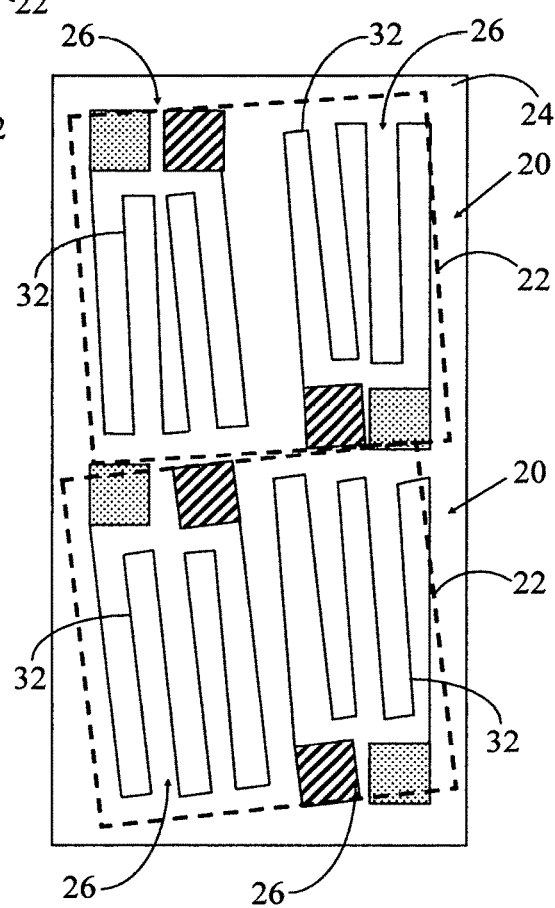
FIG. 2 shows a simplified top view of the microbolometer detectors of FIG. 1 subjected to stress induced bending and/or tilting.

FIG. 2 shows a simplified top view of microbolometer detectors 20 subjected to stress induced twisting and/or tilting. In general, detector elements 22 (sometimes referred to as bridges) are configured to absorb infrared (IR) radiation and heat up slightly as a result. During operation, a current may be run through thermistors (not shown) formed on detector elements 22. Support arms 32, connecting detector elements 22 to substrate 24, are made as long and as thin as possible to provide sufficient thermal isolation between detector elements 22 and substrate 24.

Two primary contributors of stress in detector elements 22 can be the material properties of the thermistor film and/or the absorber film that may be utilized in detector elements 22 to facilitate absorption of IR radiation. Unfortunately, stress in detector elements 22 can result in a net force on the long, thin support arms 32. The net force imposed on support arms 32 can result in their deformation to cause the in-plane twisting and/or out-of-plane tilting of microbolometer detectors 20, exemplified in FIG. 2. This twisting and/or tilting can cause physical contact between two or more detector elements 22, between support structures 26, and/or contact of detector elements 22 with the underlying substrate 24. Any of these physical contacts can cause a thermal short, thereby rendering the involved microbolometer detectors 20 nonfunctional.

Figure 3:
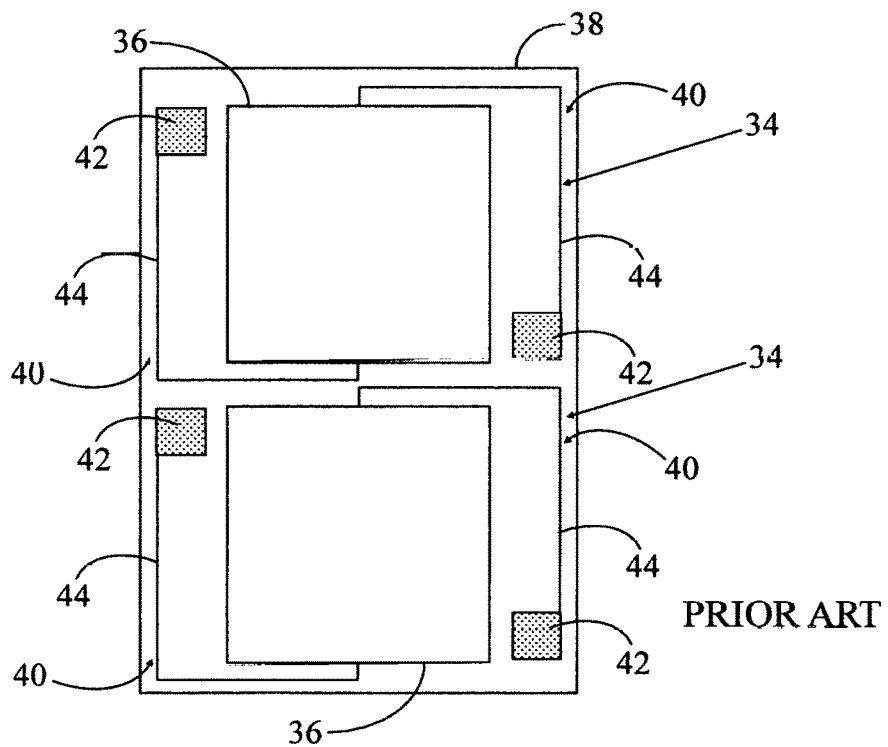
FIG. 3 shows a simplified top view of another pair of adjacent prior art microbolometer detectors that may be incorporated into a two-dimensional array of microbolometer detectors.

Referring now to FIG. 3, FIG. 3 shows a simplified top view of another pair of adjacent prior art microbolometer detectors 34 that may be incorporated into a two-dimensional array of microbolometer detectors 34. In this simplified illustration, each of microbolometer detectors 34 includes a detector element 36 (represented by a solid line box) suspended in spaced apart relationship from a substrate 38 by a pair of support structures 40. In this example, each of support structures 40 includes a post 42 (represented by a stippled pattern) projecting substantially vertically toward and connected to substrate 38 and a support arm 44 spaced apart from substrate 38. An end of support arm 44 is coupled to one of detector elements 36. Accordingly, microbolometer detectors 34 represent a configuration in which support arms 44 are laterally displaced away from detector elements 36 and are generally formed in the same layer as detector elements 36. Thus, detector elements 36 can be represented by solid line boxes since they would not normally hide any portion of support structures 40.

Figure 4:
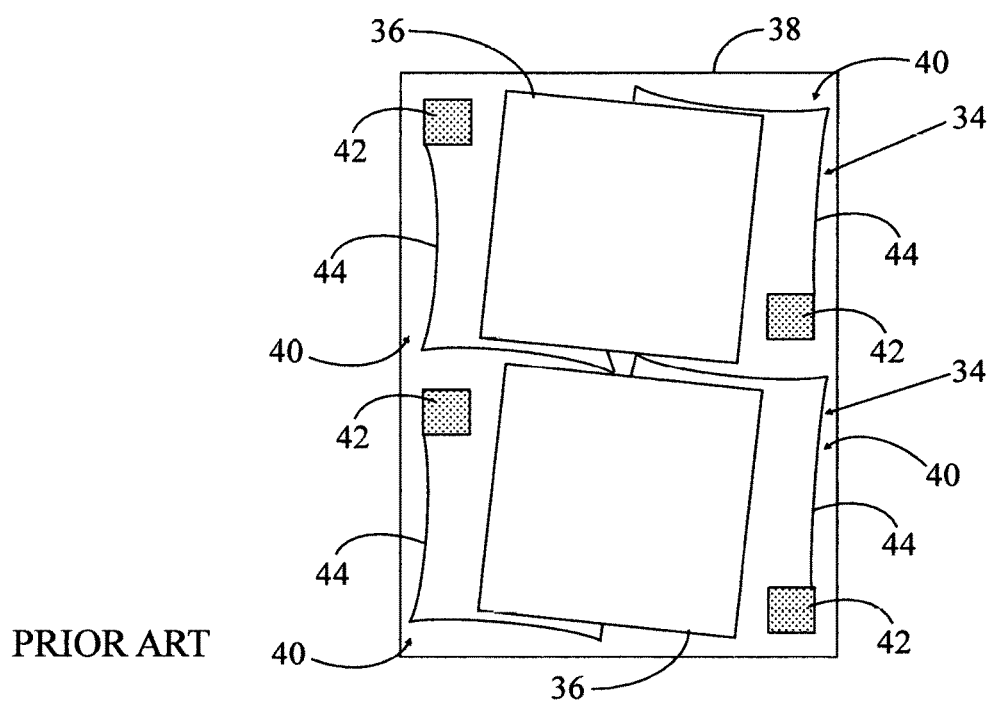
FIG. 4 shows a simplified top view of the microbolometer detectors of FIG. 3 subjected to stress induced bending and/or tilting.

FIG. 4 shows a simplified top view of microbolometer detectors 34 subjected to stress induced twisting and/or tilting. Again, the material properties of detector elements 36 can result in a net force on the long, thin support arms 44. This net force can result in deformation of support arms 44 to cause the in-plane twisting and/or out-of-plane tilting of microbolometer detectors 34, as exemplified in FIG. 4. As such, this twisting and/or tilting can cause physical contact between two or more detector elements 36, between support structures 40, and/or contact of detector elements 36 with the underlying substrate 38 resulting in a thermal short.

Figure 5:
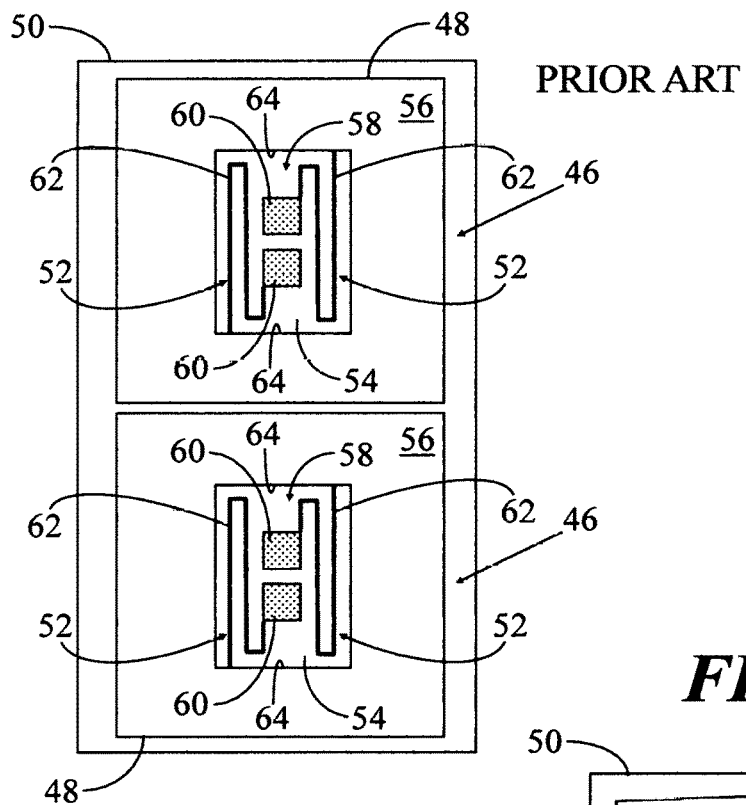
FIG. 5 shows a simplified top view of yet another pair of adjacent prior art microbolometer detectors that may be incorporated into a two-dimensional array of microbolometer detectors.

FIG. 5 shows a simplified top view of yet another pair of adjacent prior art microbolometer detectors 46 that may be incorporated into a two-dimensional array of microbolometer detectors 46. In this simplified illustration, each of microbolometer detectors 46 includes a detector element 48 (represented by a solid line box) suspended in spaced apart relationship from a substrate 50 by a pair of support structures 52. More particularly, each detector element 48 includes a central region 54 and a peripheral region 56 surrounding central region 54.

Central region 54 of each detector element 48 includes an opening 58 extending through detector element 48, and support structures 52 reside in opening 58. In this example, each of support structures 52 includes a post 60 (represented by a stippled pattern) projecting substantially vertically toward and connected to substrate 50 and a support arm 62 spaced apart from substrate 50. An end of support arm 62 is coupled to an inner edge 64 of peripheral region 56. Accordingly, microbolometer detectors 46 represent a configuration in which support arms 62 are centrally located relative to detector elements 48 and are generally formed in the same layer as detector elements 48. Thus, detector elements 48 can be represented by solid line boxes since they would not normally hide any portion of support structure 52.

Figure 6:
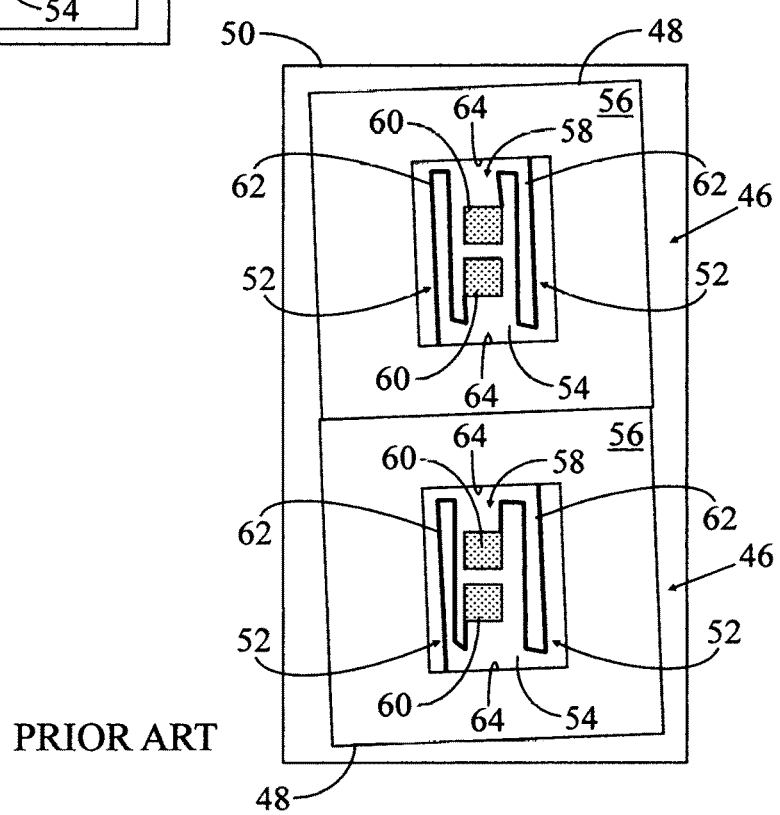
FIG. 6 shows a simplified top view of the microbolometer detectors of FIG. 5 subjected to stress induced bending and/or tilting.

FIG. 6 shows a simplified top view of the microbolometer detectors 46 subjected to stress induced twisting and/or tilting. Like the previously described examples, the material properties of detector elements 48 can result in a net force on the long, thin support arms 62. This net force can result in deformation of support arms 62 to cause the in-plane twisting and/or out-of-plane tilting of microbolometer detectors 46, as exemplified in FIG. 6. As such, this twisting and/or tilting can cause physical contact between two or more detector elements 48 and/or contact of detector elements 48 with the underlying substrate 50 resulting in a thermal short.

Embodiments described below limit the transmission of stress in the detector elements to the support structures so as to substantially prevent the twisting and/or tilting of the microbolometer detectors in an array configuration. Accordingly, a decrease in thermal shorting and malfunction of individual microbolometer detectors may be achieved in order to enhance overall performance and reliability of a microbolometer focal plane array.

Figure 7:
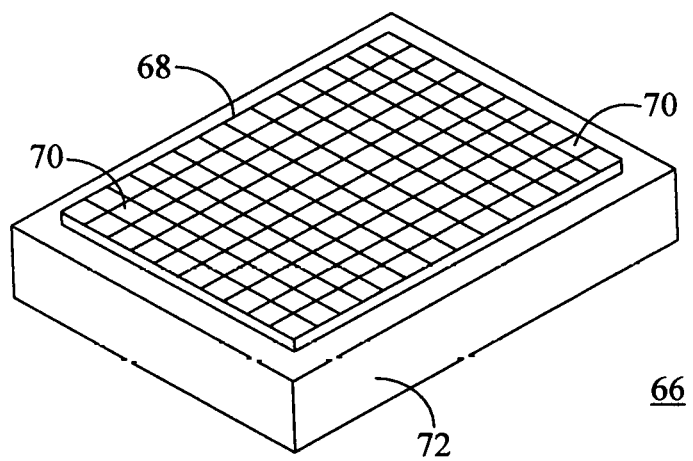
FIG. 7 shows a perspective view of a thermal detector in accordance with an embodiment.

Referring now to FIG. 7, FIG. 7 shows a perspective view of a thermal detector 66 in accordance with an embodiment. In general, thermal detector 66 may be configured to sense thermal energy and output electrical signals representative of a two-dimensional image of that sensed thermal energy.

In this example, thermal detector 66 includes a focal plane array 68 of microbolometer detectors 70 (i.e., pixels) disposed on a substrate 72. Substrate 72 can include read out integrated circuitry (ROIC). The ROIC may be configured to integrate thermally induced electrical signals from the pixel structure of microbolometer detectors 70 in focal plane array 68.

In an example embodiment, focal plane array 68 may include a plurality of microbolometer detectors 70 that are arranged in a two-dimensional array, with each microbolometer detector corresponding to a respective pixel in an imaged detected by thermal detector 66. Focal plane array 68 only includes one hundred and forty microbolometer detectors 70 for simplicity of illustration. Those skilled in the art will recognize that a focal plane array may include any suitable quantity of microbolometer detectors 70 arranged in a two-dimensional configuration that may be rectangular, octagonal, hexagonal, circular, and so forth.

The ensuing discussion and FIGS. 8-16, are provided to depict various microbolometer detector configurations that may be implemented within focal plane array 68 as microbolometer detectors 70. Each of the various microbolometer detector configurations discussed herein includes a suspended platform structure (i.e., a bridge structure) having a central beam and a split thermistor design that enables isolation of the support structure from the stress induced by the thermistor and/or absorber material of the suspended platform structure.

Figure 8:
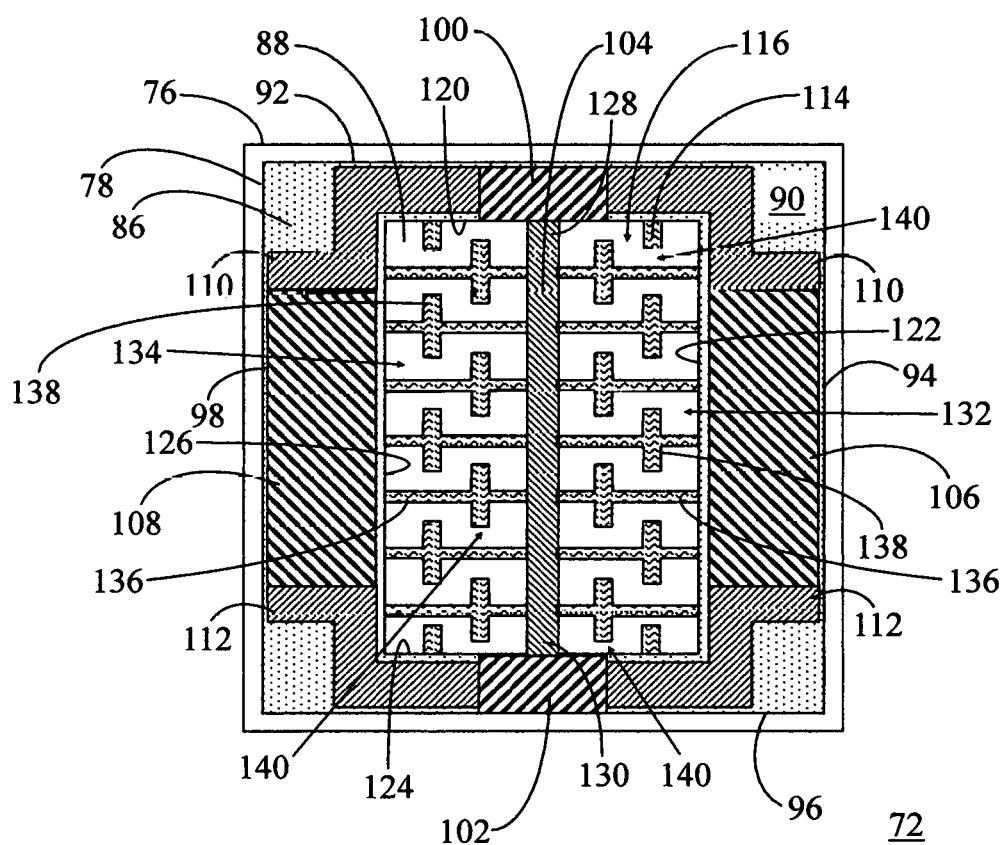
FIG. 8 shows top view of a microbolometer detector in accordance with an embodiment.
Figure 9:
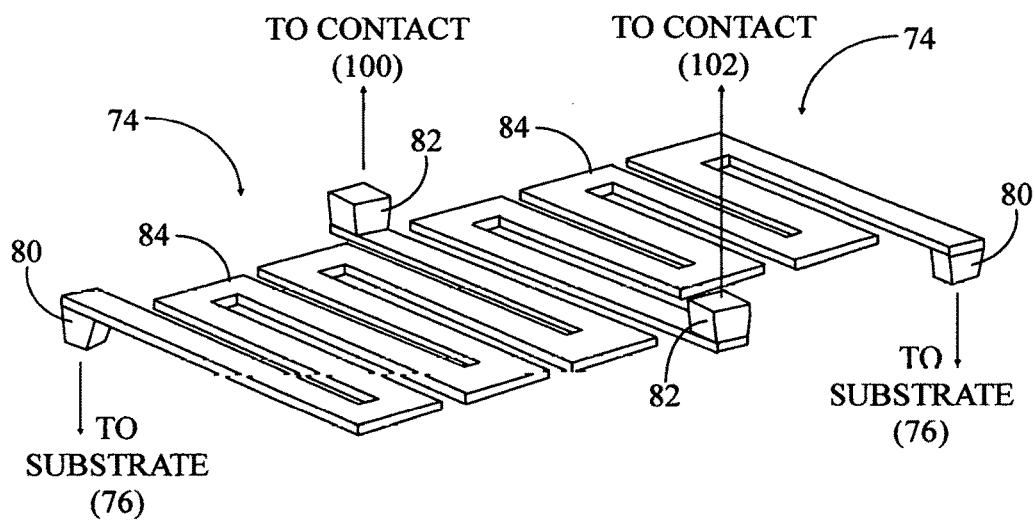
FIG. 9 shows a perspective view of a support structure that may be utilized to provide thermal isolation for the microbolometer detector element of FIG. 8.

Referring to FIGS. 8-9, FIG. 8 shows top view of a microbolometer detector 72 in accordance with an embodiment and FIG. 9 shows a perspective view of a pair of support structures 74 that may be utilized to provide thermal isolation for microbolometer detector 72. Microbolometer detector 72 includes a substrate 76, support structures 74, and a detector element 78 suspended in spaced apart relationship from substrate 76 via said support structures 74. As shown in FIG. 9, each of support structures 74 includes a first post 80 projecting substantially vertically and connected to substrate 76, a second post 82 projecting substantially vertically toward and connected to detector element 78, and a support arm 84 spaced apart from substrate 76 and having a serpentine configuration meandering between first post 80 and second post 82. Thus, support structures 74 generally correspond to support structures 26 of FIG. 1. Support structures 74 are interposed between detector element 78 and substrate 76. As such, support structures 74 are not visible in FIG. 8.

Detector element 78 includes a platform structure 86 coupled to second posts 82 of support structures 74 so that platform structure 86 is suspended apart from substrate 76. In general, platform structure 86 has a central region 88 and a peripheral region 90 surrounding central region 88. Peripheral region 90 is circumscribed by a first edge 92, a second edge 94, a third edge 96, and a fourth edge 98 in which first and third edges 92, 96 oppose one another and second and fourth edges 94, 98 oppose one another. A first contact 100, or via, is located at peripheral region 90 of platform structure 86 proximate first edge 92 and a second contact 102, or via, is located at peripheral region 90 of platform structure 86 proximate third edge 96. A relatively stiff beam structure 104 extends across central region 88 between first and second contacts 100, 102. First contact 100 is configured to be electrically and mechanically connected to second post 82 of one of support structures 74 and second contact 102 is configured to be electrically and mechanically connected to the other second post 82 of one of support structures 74 so that detector element 78 is suspended apart from substrate 76.

In this example, detector element 78 further includes a first sensor 106 located at peripheral region 90 of platform structure 86 proximate second edge 94 and a second sensor 108 located at peripheral region 90 of platform structure 86 proximate fourth edge 98. Conductive traces 110 may be suitably formed at peripheral region 90 of platform structure 86 to electrically interconnect lead ends of first and second sensors 106, 108 to first contact 100. Likewise, conductive traces 112 may be suitably formed at peripheral region 90 of platform structure 86 to electrically interconnect the opposing lead ends of first and second sensors 106, 108 to second contact 102. Conductive traces 110, 112 may be made of any suitable electrically conductive material such as aluminum, copper, gold, titanium, silver, tungsten, chrome, vanadium, and so forth.

In an embodiment, first and second sensors 106, 108 may be thermistors. A thermistor is a resistive element whose electrical resistance changes in response to temperature variations caused by the absorbed radiation. This characteristic can be used to measure amounts of radiation incident on detector element 78. Support structures 74 thermally insulate detector element 78 from substrate 76 and their immediate surroundings to allow the absorbed incident radiation to generate a temperature change in the thermistors, e.g., first and second sensors 106, 108, and to be less affected by the temperature of substrate 76. Sensors 106, 108 may be made of a material having a high temperature coefficient of resistance (TCR) in order to enable the measurement of very small temperature differences. Some materials include, for example, vanadium oxide (Vox), titanium oxide, an amorphous silicon material, and so forth.

In accordance with an example embodiment, detector element 78 further includes an optically absorptive material structure 114 located at central region 88 of platform structure 86. By way of example, central region 88 has a central opening 116 extending through platform structure 86. Peripheral region 90 has an inner perimeter delineating central opening 116 and defined by a first inner edge 120, a second inner edge 122, a third inner edge 124, and a fourth inner edge 126. First inner edge 120 is aligned with first edge 92 of peripheral region 90. Similarly, second inner edge 122 is aligned with second edge 94, third inner edge 124 is aligned with third edge 96, and fourth inner edge 126 is aligned with fourth edge 98 of peripheral region 90. Accordingly, opposing ends 128, 130 of beam structure 104 are coupled with first and third inner edges 120, 124, respectively. Thus, beam structure 104 divides central opening 116 into a first opening 132 and a second opening 134. Absorptive material structure 114 is located in each of first and second openings 132, 134.

In this configuration, absorptive material structure 114 is arranged in a grid pattern of first material portions 136 connected with second material portions 138. First material portions 136 are oriented substantially perpendicular to beam structure 104 and second material portions 138 are oriented substantially parallel to beam structure 104. First material portions 136 in first opening 132 extend continuously between and couple to both of second inner edge 122 and beam structure 104. Likewise, first material portions 136 in second opening 134 extend continuously between and couple to both of fourth inner edge 126 and beam structure 104. With regard to second material portions 138, each of second material portions 138 includes at least one discontinuity 140, or gap, between adjacent sections so that none of second material portions 138 extends continuously between and couples to first and third inner edges 120, 124. Absorptive material structure 114 may be made from chromium, nickel-chromium, vanadium, titanium, titanium-nitride, metal block, organic black, or any other suitable material.

Microbolometer detector 72 may be fabricated using conventional surface micromachining and photolithographic techniques. For example, microbolometer detector 72 may be fabricated using a monolithic integration approach, in which substrate 76 is provided with ROIC and is pre-manufactured using standard complementary metal-oxide-semiconductor (CMOS) processes. Thereafter, support structures 74 and detector element 78 (containing first and second sensors 106, 108, conductive traces 110, 112, and absorptive material structure 114) may subsequently be fabricated using common thin-layer deposition techniques paired with selective photoresist and sacrificial layer etching processes. It should be understood, however, that other fabrication techniques may be implemented for producing microbolometer detector 72.

Figure 10:
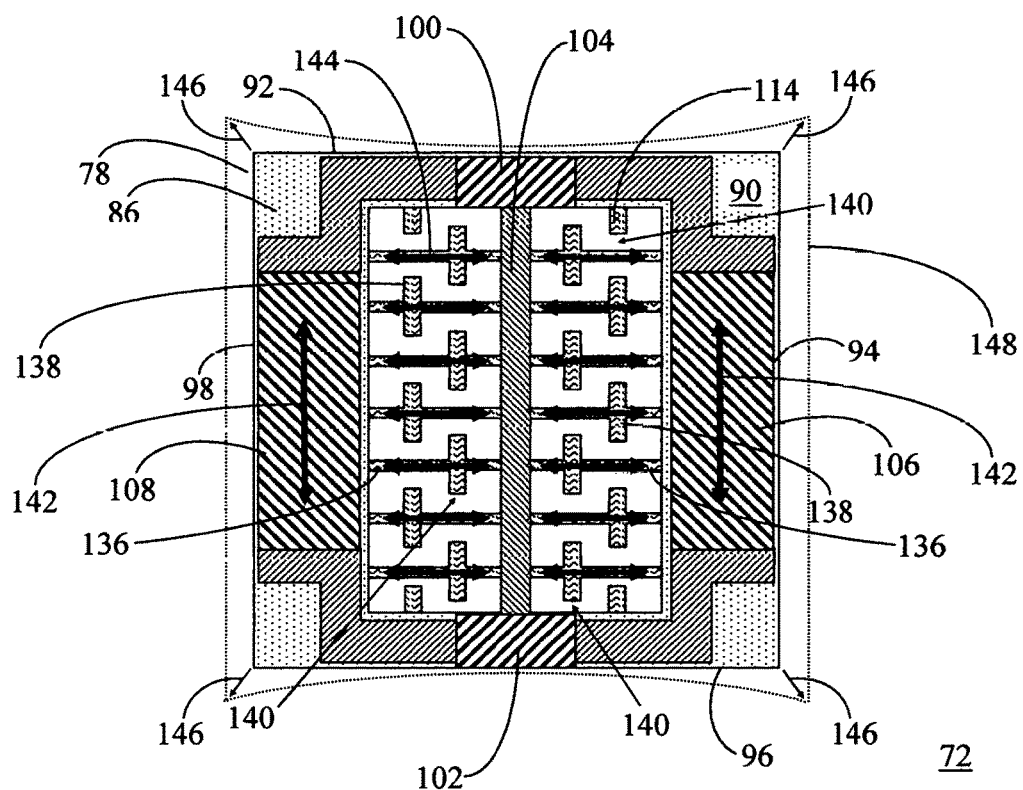
FIG. 10 shows a top view of the microbolometer detector of FIG. 8 demonstrating stresses imposed on the detector element.

FIG. 10 shows a top view of the microbolometer detector 72 demonstrating stresses imposed on detector element 78. The high stress elements of detector element 78 can include the material used to form first and second sensors 106, 108 and the material used to form absorptive material structure 114. In the split configuration of first and second sensors 106, 108, the primary orientation of stress resulting from the material properties of sensors 106, 108 is approximately parallel to beam structure 104, as indicated by bidirectional arrows 142. Additionally, the stress is largely confined to the regions distant from beam structure 104, and therefore distant from first and second contacts 100, 102. Furthermore, due to discontinuities 140 in second material portions 138 of absorptive material structure 114, the primary orientation of stress resulting from the material properties of absorptive material structure 114 is approximately perpendicular to beam structure 104, as indicated by bidirectional arrows 144. As such, following sacrificial layer etching to release platform structure 86, the expansion or growth of platform structure 86 is generally isolated at the outside region of platform structure 86 on opposing sides of beam structure 104.

Outwardly directed arrows 146 positioned at each of the outer corners of detector element 78 and a dotted line box 148 with straight sides generally parallel to second and fourth edges 94, 98 of peripheral region 90 and curvilinear lines extending toward first and third edges 92, 96 of peripheral region 90 exemplifies the stress imposed on platform structure 86. It should be recalled that first and second contacts 100, 102 mechanically and electrically couple to second posts 82 (FIG. 9) of support structures 74 (FIG. 9). These connection points are located near beam structure 104 which is the lowest stress region of platform structure 86. Thus, less stress is transmitted from platform structure 86 to the underlying support structures 74, effectively isolating the long, thin support arms 84 (FIG. 9) from stress in platform structure 86. The reduced stress yields a configuration in which support arms 84 are less likely to deform, and therefore detector element 78 is less likely to twist or tilt.

Figure 11:
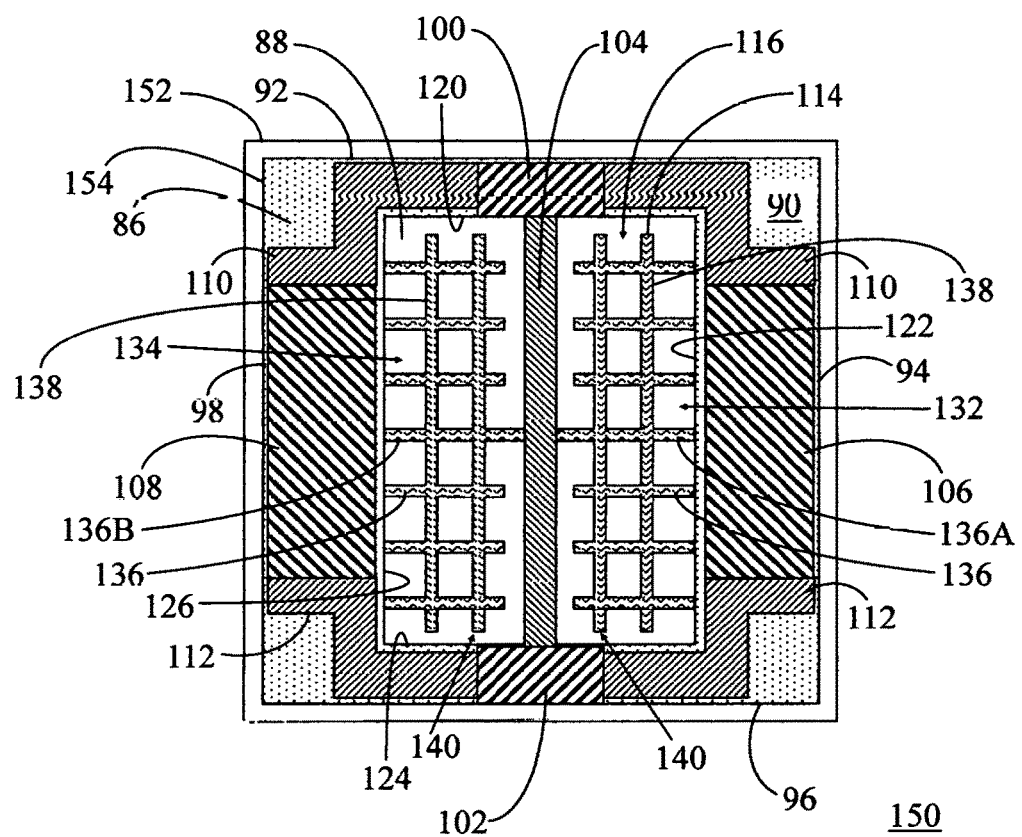
FIG. 11 shows a top view of microbolometer detector in accordance with another embodiment.

FIG. 11 shows a top view of a microbolometer detector 150 in accordance with another embodiment. Microbolometer detector 150 includes a substrate 152 and a detector element 154. Detector element 154 may be suspended in spaced apart relationship from substrate 152 via support structures 74 (FIG. 9). Therefore, as discussed above, support structures 74 are not visible in FIG. 11. Detector element 154 includes a number of elements that are similar to those presented in connection with detector element 78 of FIGS. 8-10. Hence, the same reference numbers will be utilized to correspond with similar features presented above.

Detector element 154 includes platform structure 86 that may be coupled to second posts 82 (FIG. 9) of support structures 74 so that platform structure 86 is suspended apart from substrate 152. As discussed above, platform structure 86 has central region 88 and peripheral region 90 surrounding central region 88, in which peripheral region 90 is circumscribed by first edge 92, second edge 94, third edge 96, and fourth edge 98. First contact 100 is located at peripheral region 90 of platform structure 86 proximate first edge 92 and second contact 102 is located at peripheral region 90 of platform structure 86 proximate third edge 96. Again, first contact 100 is configured to be electrically and mechanically connected to second post 82 (FIG. 9) of one of support structures 74 and second contact 102 is configured to be electrically and mechanically connected to the other second post 82 (FIG. 9) of one of support structures 74 so that detector element 154 is suspended apart from substrate 152. Beam structure 104 extends across central region 88 between first and second contacts 100, 102. Detector element 154 further includes first sensor 106, second sensor 108, conductive traces 110, and conductive traces 112 formed at peripheral region 90 of platform structure 86

In accordance with this example embodiment, detector element 154 further includes optically absorptive material structure 114 located in each of first and second openings 132, 134. Again, absorptive material structure 114 is arranged in a grid pattern of first material portions 136 (oriented substantially perpendicular to beam structure 104) connected with second material portions 138 (oriented substantially parallel to beam structure 104). In the illustrated embodiment, first material portions 136 in each of first and second openings 132, 134 are coupled to respective second and fourth inner edges 122, 126. However, only one of first material portions 136, labeled 136A, in first opening 132 extends continuously between and couples to both of second inner edge 122 and beam structure 104. Likewise, only one of first material portions 136, labeled 136B, in second opening 134 extends continuously between and couples to both of fourth inner edge 126 and beam structure 104. The remaining first material portions 136 couple to their respective second and fourth inner edges 122, 126 but do not couple to beam structure 104. With regard to second material portions 138, each of second material portions 138 includes at least one discontinuity 140, or gap, so that none of second material portions 138 extends continuously between and couples to first and third inner edges 120, 124. This configuration provides a large surface area of absorptive material structure 114 (relative to the configuration of FIG. 8), while still isolating support arms 84 (FIG. 9) of support structure 74 (FIG. 9) from stress in detector element 154 from the material properties of first and second sensors 106, 108 and of absorptive material structure 114.

Figure 12:
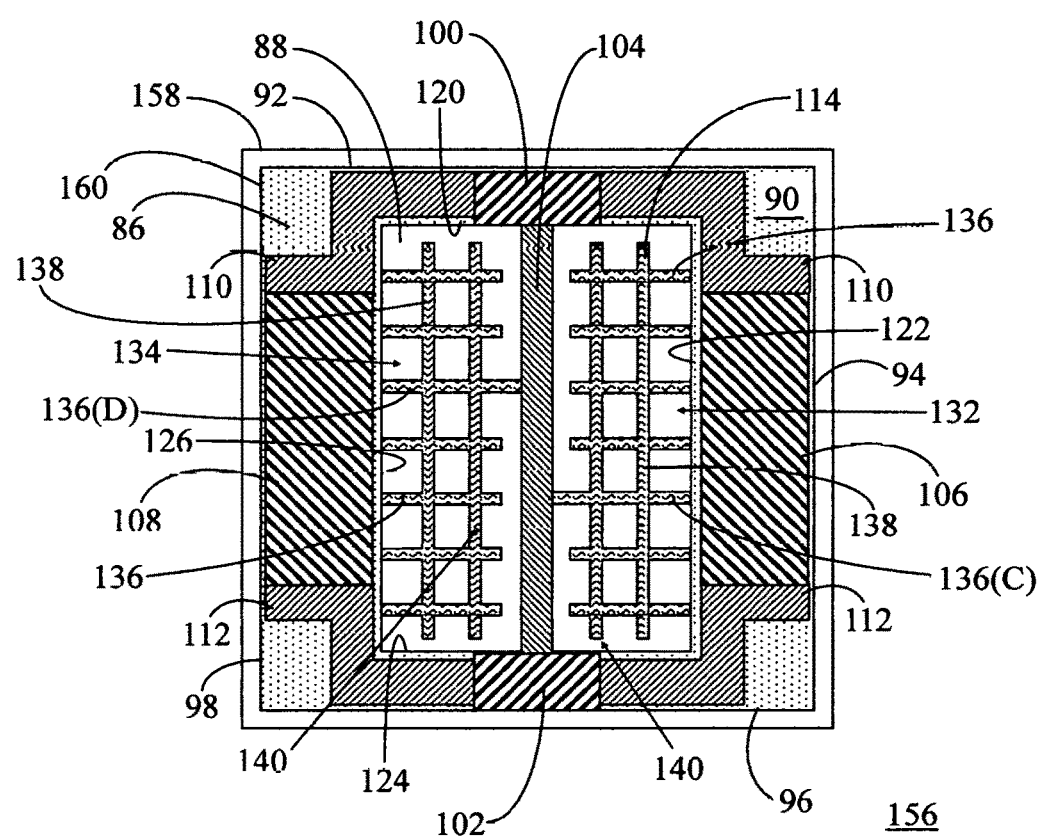
FIG. 12 shows a top view of microbolometer detector in accordance with another embodiment.

FIG. 12 shows a top view of a microbolometer detector 156 in accordance with another embodiment. Microbolometer detector 156 includes a substrate 158 and a detector element 160. Detector element 160 may be suspended in spaced apart relationship from substrate 158 via said support structures 74 (FIG. 9). Therefore, as discussed above, support structures 74 are not visible in FIG. 12. Detector element 160 includes a number of elements that are similar to those presented in connection with detector element 78 of FIGS. 8-10. Hence, the same reference numbers will be utilized to correspond with similar features presented above.

Detector element 160 includes platform structure 86 that may be coupled to second posts 82 (FIG. 9) of support structures 74 so that platform structure 86 is suspended apart from substrate 158. As discussed above, platform structure 86 has central region 88 and peripheral region 90 surrounding central region 88, in which peripheral region 90 is circumscribed by first edge 92, second edge 94, third edge 96, and fourth edge 98. First contact 100 is located at peripheral region 90 of platform structure 86 proximate first edge 92 and second contact 102 is located at peripheral region 90 of platform structure 86 proximate third edge 96. Again, first contact 100 is configured to be electrically and mechanically connected to second post 82 (FIG. 9) of one of support structures 74 and second contact 102 is configured to be electrically and mechanically connected to the other second post 82 (FIG. 9) of one of support structures 74 so that detector element 160 is suspended apart from substrate 158. Beam structure 104 extends across central region 88 between first and second contacts 100, 102. Detector element 160 further includes first sensor 106, second sensor 108, conductive traces 110, and conductive traces 112 formed at peripheral region 90 of platform structure 86

In accordance with this example embodiment, detector element 160 further includes optically absorptive material structure 114 located in each of first and second openings 132, 134. Again, absorptive material structure 114 is arranged in a grid pattern of first material portions 136 (oriented substantially perpendicular to beam structure 104) connected with second material portions 138 (oriented substantially parallel to beam structure 104). In the illustrated embodiment, first material portions 136 in each of first and second openings 132, 134 couple to respective second and fourth inner edges 122, 126. However, only one of first material portions 136, labeled 136C, in first opening 132 extends continuously between and couples to both of second inner edge 122 and beam structure 104. Likewise, only one of first material portions 136, labeled 136D, in second opening 134 extends continuously between and couples to both of fourth inner edge 126 and beam structure 104. The remaining first material portions 136 couple to their respective second and fourth inner edges 122, 126 but do not couple to beam structure 104. With regard to second material portions 138, each of second material portions 138 includes at least one discontinuity 140, or gap, so that none of second material portions 138 extends continuously between and couples to first and third inner edges 120, 124.

In this configuration, where first material portion 136C couples with beam structure 104 is offset from where second material portion 136D couples with beam structure 104. Offsetting the locations where the absorptive material structure 114 couples with beam structure 104 may result in the compressive stress of absorptive material structure 114 bending beam structure 104 into an "S" shape. This could place beam structure 104 in tension, even if it's formed from a naturally compressive film. Further, this configuration still provides a large surface area of absorptive material structure 114 (relative to the configuration of FIG. 8), while still isolating support arms 84 (FIG. 9) of support structure 74 (FIG. 9) from stress in detector element 160 from the material properties of first and second sensors 106, 108 and of absorptive material structure 114.

Figure 13:
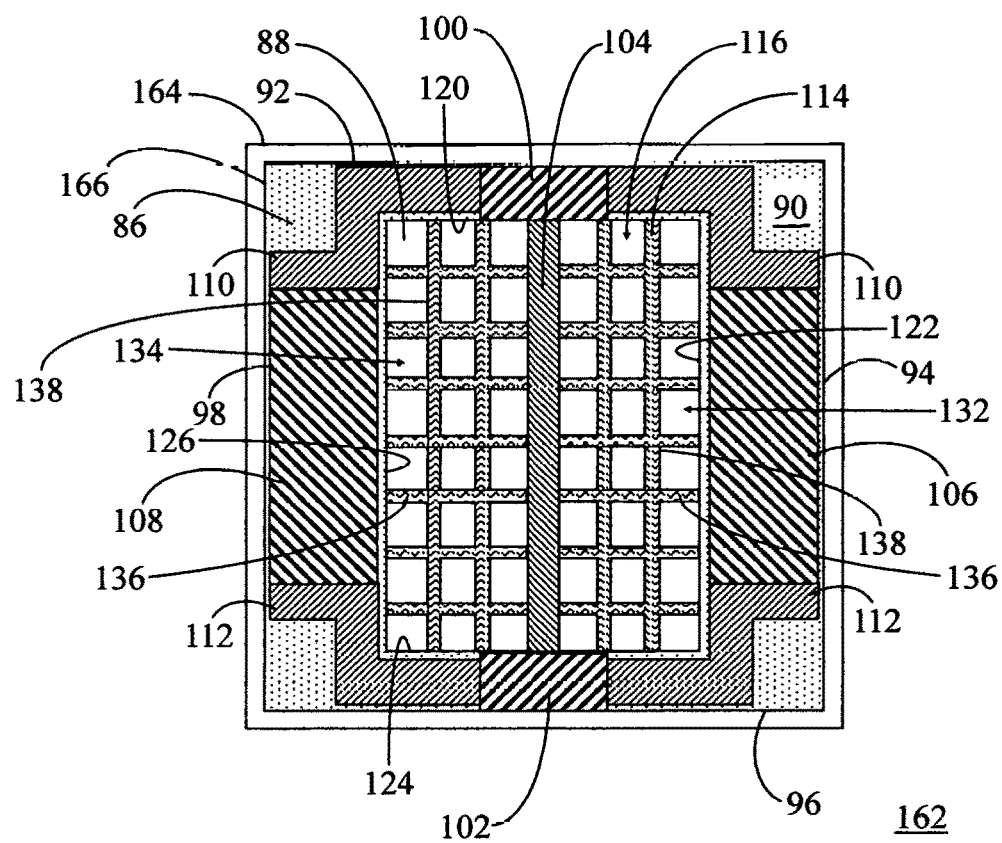
FIG. 13 shows a top view of microbolometer detector in accordance with another embodiment.

FIG. 13 shows a top view of a microbolometer detector 162 in accordance with another embodiment. Microbolometer detector 162 includes a substrate 164 and a detector element 166. Detector element 166 is another variation of those described above. Thus, detector element 166 includes platform structure 86 having central region 88 and peripheral region 90 surrounding central region 88, in which peripheral region 90 is circumscribed by first edge 92, second edge 94, third edge 96, and fourth edge 98. First contact 100 is located at peripheral region 90 of platform structure 86 proximate first edge 92 and second contact 102 is located at peripheral region 90 of platform structure 86 proximate third edge 96. Beam structure 104 extends across central region 88 between first and second contacts 100, 102. Detector element 166 further includes first sensor 106, second sensor 108, conductive traces 110, and conductive traces 112 formed at peripheral region 90 of platform structure 86

In accordance with this example embodiment, detector element 166 further includes optically absorptive material structure 114 located in each of first and second openings 132, 134. Again, absorptive material structure 114 is arranged in a grid pattern of first material portions 136 (oriented substantially perpendicular to beam structure 104) connected with second material portions 138 (oriented substantially parallel to beam structure 104). In this illustrated embodiment, each of first material portions 136 in first opening 132 extends continuously between and couples to both of second inner edge 122 and beam structure 104. Additionally, each of second material portions 138 in first opening 132 extends continuously between and couples to both of first and third inner edges 120, 124. Likewise, each of first material portions 136 in second opening 134 extends continuously between and couples to both of fourth inner edge 126 and beam structure 104. Additionally, each of second material portions 138 in second opening 134 extends continuously between and couples to both of first and third inner edges 120, 124. In this configuration, an underlying support structure (e.g., support structures 74) may be sufficiently isolated from stress in first and second sensors 106, 108. However, the underlying support structure may be less isolated from stress in absorptive material structure 114.

Figure 14:
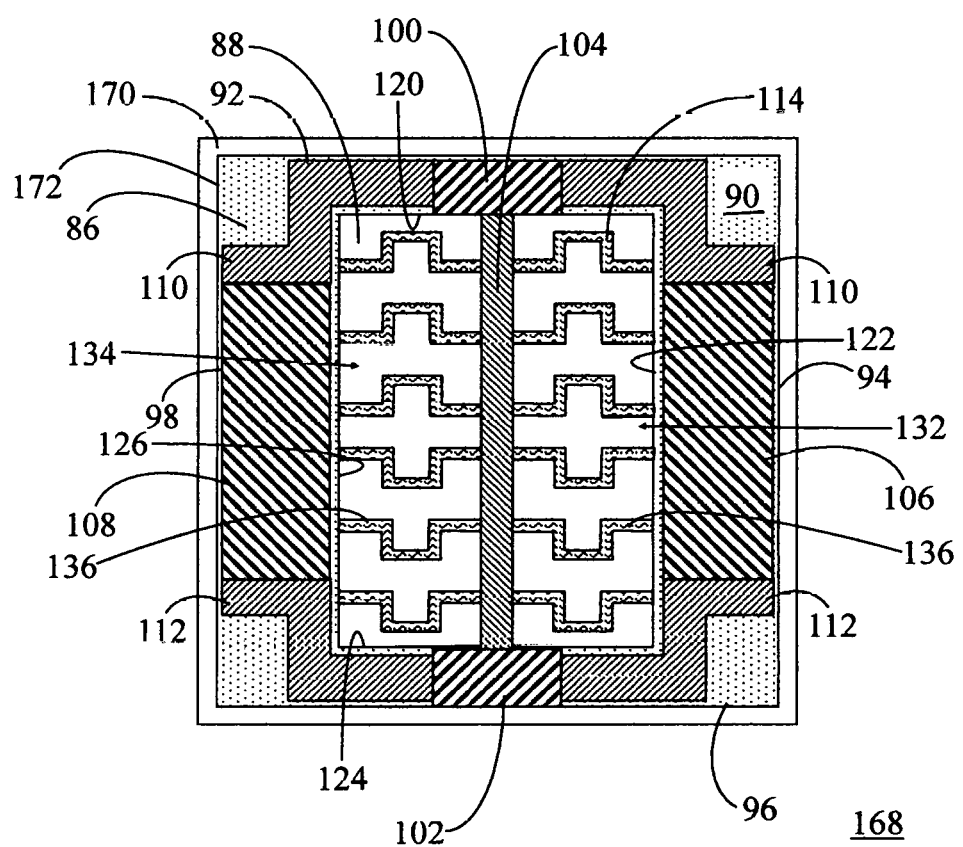
FIG. 14 shows a top view of microbolometer detector in accordance with another embodiment.

FIG. 14 shows a top view of a microbolometer detector 168 in accordance with yet another embodiment. Microbolometer detector 168 includes a substrate 170 and a detector element 172. Detector element 172 is another variation of those described above. Thus, detector element 172 includes platform structure 86 having central region 88 and peripheral region 90 surrounding central region 88, in which peripheral region 90 is circumscribed by first edge 92, second edge 94, third edge 96, and fourth edge 98. First contact 100 is located at peripheral region 90 of platform structure 86 proximate first edge 92 and second contact 102 is located at peripheral region 90 of platform structure 86 proximate third edge 96. Beam structure 104 extends across central region 88 between first and second contacts 100, 102. Detector element 172 further includes first sensor 106, second sensor 108, conductive traces 110, and conductive traces 112 formed at peripheral region 90 of platform structure 86

In accordance with this example embodiment, detector element 172 further includes optically absorptive material structure 114 located in each of first and second openings 132, 134. Absorptive material structure 114 includes first material portions 136 in first opening 132 extending continuously between and coupling to both of second inner edge 122 and beam structure 104. Additionally, absorptive material structure 114 includes first material portions 136 in second opening 134 extending continuously between and coupling to both of fourth inner edge 126 and beam structure 104. However, unlike the grid patterns described above, second material portions extending parallel to beam structure 104 are not present. Instead, first material portions 136 are arranged as spring elements to further absorb stress in absorptive material structure 114.

Previous embodiments of microbolometer detectors implemented a two-layer structural configuration in which the support structure (e.g., support structures 74 of FIG. 9) are interposed between the detector element and the substrate. The centrally located beam structure, the split sensors, and the various configurations of the absorptive material structure function to substantially isolate the long thin support arms of the support structures from stresses in the materials of the detector element. Therefore, the structures illustrated in FIGS. 8-14 may substantially reduce or prevent the twisting and/or tilting that may be present in prior art detector elements 20 (FIG. 2). As will be discussed in connection with FIGS. 15 and 16, this stress isolation may also be achieved in structural configurations in which the support structures and the detector elements are generally located in the same plane, i.e., a single-layer structural configuration.

Figure 15:
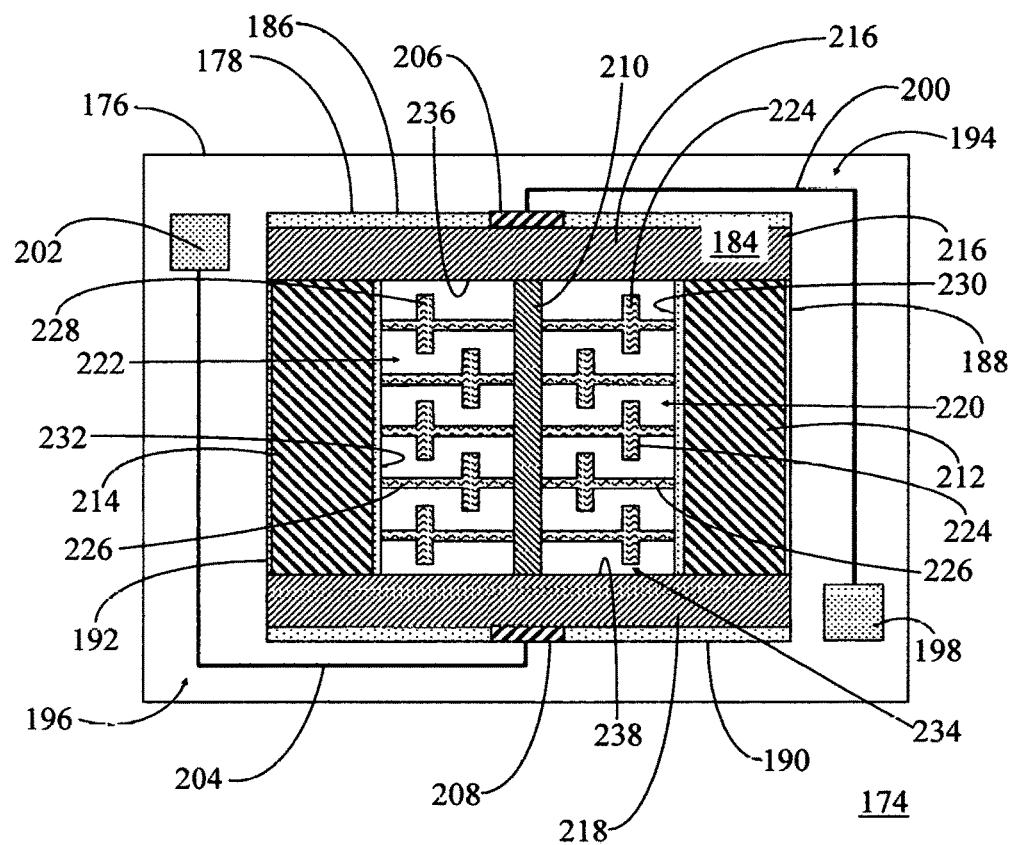
FIG. 15 shows a top view of microbolometer detector in accordance with another embodiment.

Referring now to FIG. 15, FIG. 15 shows a top view of a microbolometer detector 174 in accordance with another embodiment. Microbolometer detector 174 includes a substrate 176 and a detector element 178. Detector element 178 includes a platform structure 180 having a central region 182 and a peripheral region 184 surrounding central region 182. Peripheral region 184 is circumscribed by a first edge 186, a second edge 188, a third edge 190, and a fourth edge 192 in which first edge 186 opposes third edge 190 and second edge 188 opposes fourth edge 192.

Detector element 178 may be suspended in spaced apart relationship from substrate 176 via support structures 194, 196. Support structure 194 includes a post 198 projecting substantially vertically toward and connected to substrate 176 and a support arm 200 extending from post 198 and spaced apart from substrate 176. Likewise, support structure 196 includes a post 202 projecting substantially vertically toward and connected to substrate 176 and a support arm 204 extending from post 202 and spaced apart from substrate 176. In this configuration support arm 200 is coupled to first edge 186 of platform structure 180 and support arm 204 is coupled to third edge 190 of platform structure 182. Accordingly, microbolometer detector 174 represents a configuration in which support arms 200, 204 are laterally displaced away from detector element 178 and are generally formed in the same layer as detector element 178. Thus, support structures 194, 196 are visible in the top view illustration of FIG. 15.

Detector element 178 includes a first contact 206 located at peripheral region 184 proximate first edge 186 and a second contact 208 located at peripheral region 184 proximate third edge 190. First contact 206 may be electrically and mechanically coupled with support arm 200 of support structure 194, and second contact 208 may be electrically and mechanically coupled with support arm 204 of support structure 196 so that detector element 178 is suspended apart from substrate 176. A beam structure 210 extends across central region 182 between first and second contacts 206, 208. Detector element 178 further includes a first and second sensors 212, 214 (e.g., thermistors) formed at peripheral region 184 of platform structure 180 proximate respective second and fourth edges 188, 192, a conductive trace 216 electrically coupling lead ends of first and second sensors 212, 214 with first contact 206, and a conductive trace 218 electrically coupling the opposing lead ends of first and second sensors 212, 214 with second contact 208.

Like the previously described embodiments, beam structure 210 extends across central region 182 to produce a first opening 220 and a second opening 222, and detector element 178 further includes an optically absorptive material structure 224 located in each of first and second openings 220, 222. Absorptive material structure 224 is arranged in a grid pattern of first material portions 226 (oriented substantially perpendicular to beam structure 210) connected with second material portions 228 (oriented substantially parallel to beam structure 210). In the illustrated embodiment, each of first material portions 226 in first opening 220 extends continuously between and couples to each of a second inner edge 230 of peripheral region 184 and to beam structure 210. Likewise, each of first material portions 226 in second opening 222 extends continuously between and couples to each of a fourth inner edge 232 of peripheral region 184 and to beam structure 210. With regard to second material portions 228, each of second material portions 228 includes at least one discontinuity 234, or gap, so that none of second material portions 228 extends continuously between and couples to opposing first and third inner edges 236, 238 of peripheral region 184. This configuration provides a relatively large surface area of absorptive material structure 224, while still isolating support arms 200, 204 of support structures 194, 196 from stress in detector element 178 from the material properties of first and second sensors 212, 214 and of absorptive material structure 224. Therefore, the structure illustrated in FIG. 15 may substantially reduce or prevent the twisting and/or tilting that may be present in prior art detector elements 34 (FIG. 4).

Figure 16:
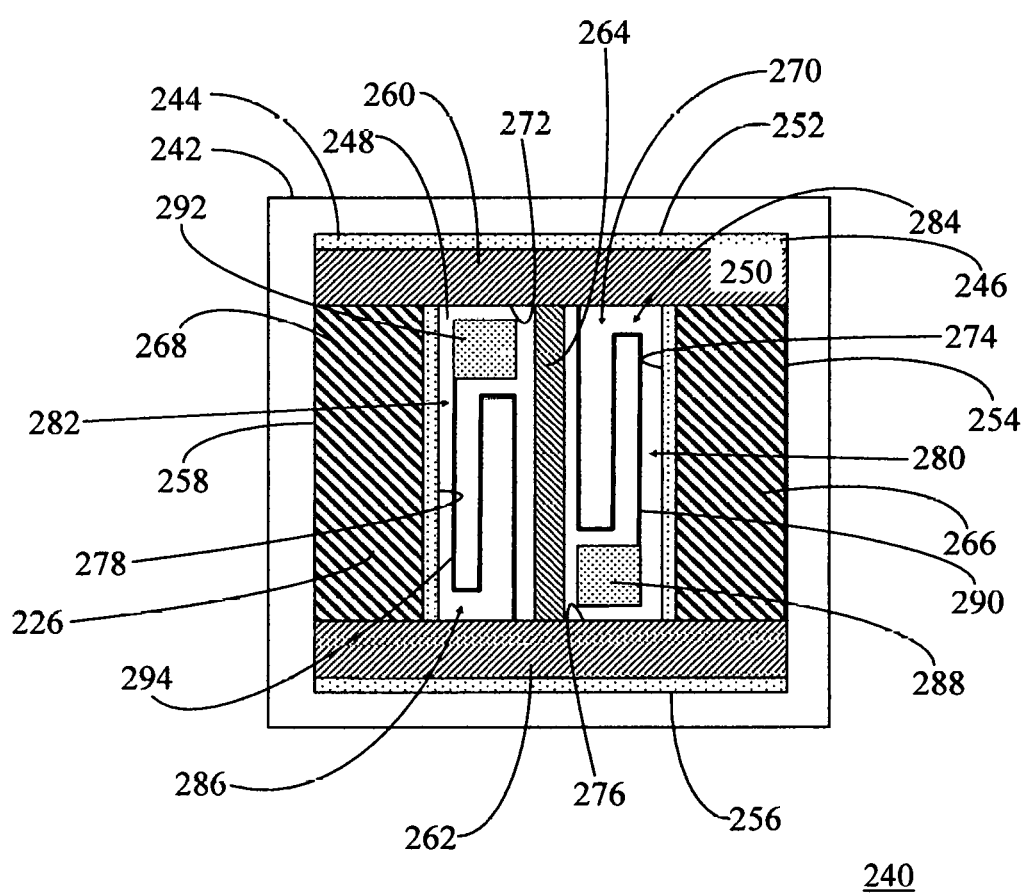
FIG. 16 shows a top view of microbolometer detector in accordance with another embodiment.

FIG. 16 shows a top view of a microbolometer detector 240 in accordance with another embodiment. Microbolometer detector 240 includes a substrate 242 and a detector element 244. Detector element 244 includes a platform structure 246 having a central region 248 and a peripheral region 250 surrounding central region 248. Peripheral region 250 is circumscribed by a first edge 252, a second edge 254, a third edge 256, and a fourth edge 258 in which first edge 252 opposes third edge 256 and second edge 254 opposes fourth edge 258.

A first contact 260 may be located at peripheral region 250 of platform structure 246 proximate first edge 252 and a second contact 262 may be located at peripheral region 250 of platform structure 246 proximate third edge 256. A relatively stiff beam structure 264 extends across central region 248 between first and second contacts 260, 262. In this example, detector element 244 further includes a first sensor 266 located at peripheral region 250 of platform structure 246 proximate second edge 254 and a second sensor 268 located at peripheral region 250 of platform structure 246 proximate fourth edge 258. First contact 260 may be suitably configured to be electrically interconnected with lead ends of first and second sensors 266, 268. Likewise, second contact 262 may be suitably configured to be electrically interconnected with the opposing lead ends of first and second sensors 266, 268.

Central region 248 of detector element 244 has a central opening extending through platform structure 246. The peripheral region 250 has an inner perimeter delineating the central opening and defined by a first inner edge 272, a second inner edge 274, a third inner edge 276, and a fourth inner edgy 278. First inner edge 272 is aligned with first edge 252 of peripheral region 250. Similarly, second inner edge 274 is aligned with second edge 254, third inner edge 276 is aligned with third edge 256, and fourth inner edge 278 is aligned with fourth edge 258 of peripheral region 250. Accordingly, opposing ends of beam structure 264 are coupled with first and third inner edges 272, 276 respectively. Thus, beam structure 264 divides central opening 270 into a first opening 280 and a second opening 282.

Detector element 244 may be suspended in spaced apart relationship from substrate 242 via support structures 284, 286, where support structure 284 is located in first opening 280 and support structure 286 is located in second opening 282. In this example, support structure 284 includes a post 288 projecting substantially vertically toward and connected to substrate 242 and a support arm 290 extending from post 288 and spaced apart from substrate 242. Similarly, support structure 286 includes a post 292 projecting substantially vertically toward and connected to substrate 242 and a support arm 294 extending from post 292 and spaced apart from substrate 242. An end of support arm 290 is coupled to first inner edge 272 and an end of support arm 294 is coupled to third inner edge 276. Accordingly, microbolometer detector 240 represents a configuration in which support structures 284, 286 are centrally located relative to detector element 244 and are generally formed in the same layer as detector element 244. Thus, support structures 284, 286 are visible in the top view illustration of FIG. 16.

Unlike the previously described embodiments, detector element 244 does not include optically absorptive material located in first and second openings 280, 282 because the location at which the absorptive material structure might be positioned is where support structures 284, 286 are located. Nevertheless, the inclusion of beam structure 264 and the split sensor configuration of sensors 266, 268 can serve to isolate support arms 290, 294 from stress in detector element 244 from the material properties of first and second sensors 266, 268. Therefore, the structure illustrated in FIG. 16 may substantially reduce or prevent the twisting and/or tilting that may be present in prior art detector elements 46 (FIG. 6).

It is to be understood that other detector element and microbolometer configurations may be envisioned that include the relatively stiff central beam, the split sensor structure, and (in some structures) the absorptive material structure in a single-layer, two-layer, or greater than two layer structure so as to substantially isolate the long thin arms of the support structures from stresses in the materials used to fabricate the detector element.

Thus, various embodiments of a detector element and a microbolometer detector for a microbolometer focal plane array have been described. An embodiment of a detector element for a microbolometer detector comprises a platform structure spaced apart from a substrate, the platform structure having a central region and a peripheral region surrounding the central region, the peripheral region being circumscribed by a first edge, a second edge, a third edge, and a fourth edge, the first and third edges opposing one another, the second and fourth edges opposing one another. The detector element further comprises a first contact is located at the peripheral region of the platform structure proximate the first edge, a second contact located at the peripheral region proximate the third edge, a beam structure extending across the central region between the first and second contacts, and at least one sensor located at the peripheral region proximate at least one of the second and fourth edges.

An embodiment of a microbolometer detector comprises a substrate, a support structure connected to the substrate, and a detector element suspended in spaced apart relationship from the substrate by the support structure. The detector element comprises a platform structure coupled to the support structure, the platform structure having a central region and a peripheral region surrounding the central region, the peripheral region being circumscribed by a first edge, a second edge, a third edge, and a fourth edge, the first and third edges opposing one another, the second and fourth edges opposing one another. The detector element further comprises a first contact located at the peripheral region of the platform structure proximate the first edge, a second contact located at the peripheral region proximate the third edge, a beam structure extending across the central region between the first and second contacts, and at least one sensor located at the peripheral region proximate at least one of the second and fourth edges.

Another embodiment of a detector element for a microbolometer detector comprises a platform structure spaced apart from a substrate, the platform structure having a central region and a peripheral region surrounding the central region, the peripheral region being circumscribed by a first edge, a second edge, a third edge, and a fourth edge, the first and third edges opposing one another, the second and fourth edges opposing one another. The detector element further comprises a first contact located at the peripheral region of the platform structure proximate the first edge, a second contact located at the peripheral region proximate the third edge, a beam structure extending across the central region between the first and second contacts, a first thermistor located at the peripheral region proximate the second edge, a second thermistor located at the peripheral region proximate the fourth edge, and an optically absorptive material structure located at the central region, wherein the optically absorptive material structure is arranged in a grid pattern of first material portions connected with second material portions, the first material portions being oriented substantially perpendicular to the beam structure and second material portions being oriented substantially parallel to the beam structure, and each of the second material portions includes at least one discontinuity such that none of the second material portions extends continuously between and couples to both of first and third inner edges of an inner periphery of the peripheral region.

The structures, discussed above, and the inventive principles thereof entail a detector element, a microbolometer detector that includes the detector element suspended above a substrate by a support structure, and a microbolometer focal plane array that includes a plurality of the microbolometer detectors. More particularly, the structures and inventive principles thereof entail a design for the detector element which substantially isolates the support structure from stress in the detector element. This stress isolation results in less stress being transmitted to the support structure. A reduction in stress to the support structure can limit twisting and/or tilting of the detector element to commensurately reduce the potential for malfunction due to thermal shorting between adjacent microbolometer detectors.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A detector element for a microbolometer detector comprising:
   a platform structure spaced apart from a substrate, said platform structure having a central region and a peripheral region surrounding said central region, said peripheral region being circumscribed by a first edge, a second edge, a third edge, and a fourth edge, said first and third edges opposing one another, said second and fourth edges opposing one another;
   a first contact located at said peripheral region of said platform structure proximate said first edge;
   a second contact located at said peripheral region proximate said third edge;
   a beam structure extending across said central region between said first and second contacts; and
   at least one sensor located at said peripheral region proximate at least one of said second and fourth edges.

2. The detector element of claim 1 wherein said beam structure is configured to substantially prevent deformation of said platform structure in a direction parallel to a length of said beam structure.

3. The detector element of claim 1 wherein said at least one sensor comprises:
   a first sensor proximate said second edge of said peripheral region; and
   a second sensor proximate said fourth edge of said peripheral region.

4. The detector element of claim 1 wherein said at least one sensor is a thermistor.

5. The detector element of claim 1 wherein said platform structure further comprises an optically absorptive material structure located at said central region.

6. The detector element of claim 5 wherein:
   said central region of said platform structure has an opening extending through said platform structure, said opening having an inner perimeter, said inner perimeter being defined by a first inner edge aligned with said first edge of said peripheral region, a second inner edge aligned with said second edge of said peripheral region, a third inner edge aligned with said third edge of said peripheral region, and a fourth inner edge aligned with said fourth edge of said peripheral region;
   opposing ends of said beam structure are coupled with said first and third inner edges;
   said optically absorptive material structure is located in said opening and is arranged in a grid pattern of first material portions connected with second material portions, said first material portions being oriented substantially perpendicular to said beam structure and second material portions being oriented substantially parallel to said beam structure.

7. The detector element of claim 6 wherein each of said second material portions includes at least one discontinuity such that none of said second material portions extends continuously between and couples to both of said first and third inner edges.

8. The detector element of claim 6 wherein:
   a first one of said first material portions extends continuously between and couples to both of said beam structure and said second inner edge; and
   a second one of said first material portions extends continuously between and couples to both of said beam structure and said fourth inner edge.

9. The detector element of claim 5 wherein:
   said central region comprises a central opening extending through said platform structure, said central opening having an inner perimeter, said inner perimeter being defined by a first inner edge aligned with said first edge of said peripheral region, a second inner edge aligned with said second edge of said peripheral region, a third inner edge aligned with said third edge of said peripheral region, and a fourth inner edge aligned with said fourth edge of said peripheral region;
   opposing ends of said beam structure are coupled with said first and third inner edges to split said central opening into a first opening and a second opening that is separated from said first opening by said beam structure;
   said absorptive material structure includes material portions in each of said first and second openings, wherein said material portions in said first opening extend between and couple to each of said second inner edge and said beam structure, said material portions in said second opening extend between and couple to each of said fourth inner edge and said beam structure, and each of said material portions comprises a spring element.

10. The detector element of claim 1 wherein said platform structure is configured to be coupled to said substitute via an intervening support structure.

11. A microbolometer detector comprising:
    a substrate;
    a support structure connected to said substrate; and
    a detector element suspended in spaced apart relationship from said substrate by said support structure, said detector element comprising:
       a platform structure coupled to said support structure, said platform structure having a central region and a peripheral region surrounding said central region, said peripheral region being circumscribed by a first edge, a second edge, a third edge, and a fourth edge, said first and third edges opposing one another, said second and fourth edges opposing one another;
       a first contact located at said peripheral region of said platform structure proximate said first edge;
       a second contact located at said peripheral region proximate said third edge;
       a beam structure extending across said central region between said first and second contacts; and
       at least one sensor located at said peripheral region proximate at least one of said second and fourth edges.

12. The microbolometer detector of claim 11 wherein said support structure comprises:
    a first post projecting substantially vertically toward and connected to said substrate;
    a second post projecting substantially vertically toward and connected to said platform structure; and
    a support arm spaced apart from said substrate, said support arm having a serpentine configuration meandering between said first post and said second post.

13. The microbolometer detector of claim 11 wherein said support structure comprises:
    a post projecting substantially vertically toward and connected to said substrate; and
    a support arm extending from said post and spaced apart from said substrate, said support arm being coupled to one of said first and third edges of said peripheral region of said platform structure.

14. The microbolometer detector of claim 11 wherein:
said central region comprises a central opening extending through said platform structure, said central opening having an inner perimeter, said inner perimeter being defined by a first inner edge aligned with said first edge of said peripheral region, a second inner edge aligned with said second edge of said peripheral region, a third inner edge aligned with said third edge of said peripheral region, and a fourth inner edge aligned with said fourth edge of said peripheral region;
opposing ends of said beam structure are coupled with said first and third inner edges to split said central opening into a first opening and a second opening that is separated from said first opening by said beam structure; and
said support structure comprises:
  a first post projecting substantially vertically toward and connected to said substrate;
  a first support arm extending from said first post and spaced apart from said substrate, said first support arm being coupled to said first inner edge of said peripheral region, said first port and said first support arm being located in said first opening of said central region;
  a second post projecting substantially vertically toward and connected to said substrate;
  a second support arm extending from said second post and spaced apart from said substrate, said second support arm being coupled to said third inner edge of said peripheral region, said second post and said second support arm being located in said second opening of said central region.

15. The microbolometer detector of claim 11 wherein said at least one sensor comprises:
  a first thermistor proximate said second edge of said peripheral region; and
  a second thermistor proximate said fourth edge of said peripheral region.

16. The microbolometer detector of claim 11 wherein said platform structure further comprises an optically absorptive material structure located at said central region.

17. The microbolometer detector of claim 16 wherein:
said central region comprises an opening extending through said platform structure, said opening having an inner perimeter, said inner perimeter being defined by a first inner edge aligned with said first edge of said peripheral region, a second inner edge aligned with said second edge of said peripheral region, a third inner edge aligned with said third edge of said peripheral region, and a fourth inner edge aligned with said fourth edge of said peripheral region;

opposing ends of said beam structure are coupled with said first and third inner edges; and
said optically absorptive material structure is located in said opening and is arranged in a grid pattern of first material portions connected with second material portions, said first material portions being oriented substantially perpendicular to said beam structure and second material portions being oriented substantially parallel to said beam structure.

18. The microbolometer detector of claim 17 wherein each of said second material portions includes at least one discontinuity such that none of said second material portions extends continuously between and couples to both of said first and third inner edges.

19. A microbolometer focal plane array comprising a plurality of microbolometer detectors according to claim 11, wherein said plurality of microbolometer detectors is arranged in a two-dimensional array.

20. A detector element for a microbolometer detector comprising:
  a platform structure spaced apart from a substrate, said platform structure having a central region and a peripheral region surrounding said central region, said peripheral region being circumscribed by a first edge, a second edge, a third edge, and a fourth edge, said first and third edges opposing one another, said second and fourth edges opposing one another,
  a first contact located at said peripheral region of said platform structure proximate said first edge;
  a second contact located at said peripheral region proximate said third edge;
  a beam structure extending across said central region between said first and second contacts;
  a first thermistor located at said peripheral region proximate said second edge;
  a second thermistor located at said peripheral region proximate said fourth edge; and
  an optically absorptive material structure located at said central region, wherein said optically absorptive material structure is arranged in a grid pattern of first material portions connected with second material portions, said first material portions being oriented substantially perpendicular to said beam structure and second material portions being oriented substantially parallel to said beam structure, and each of said second material portions includes at least one discontinuity such that none of said second material portions extends continuously between and couples to both of first and third inner edges of an inner periphery of said peripheral region.

* * * * *